United States Patent [19]

Mutschler et al.

[11] 4,284,903
[45] Aug. 18, 1981

[54] DEVICE FOR ADJUSTING THE INCLINATION OF MOTOR VEHICLE HEADLAMPS

[75] Inventors: Erich Mutschler; Hans Prohaska, both of Bietigheim-Bissingen; Franz Schreiber, Kirchheim; Karl-Friedrich Schubert; Adam Weber, both of Bietigheim-Bissingen, all of Fed. Rep. of Germany

[73] Assignee: ITT Industries, Inc., New York, N.Y.

[21] Appl. No.: 961,734

[22] Filed: Nov. 17, 1978

[30] Foreign Application Priority Data

Nov. 19, 1977 [DE] Fed. Rep. of Germany ....... 2751728

[51] Int. Cl.³ ...................... H01H 21/00; G05D 3/10
[52] U.S. Cl. ........................... 307/10 LS; 200/153 N; 318/673
[58] Field of Search ................... 307/10 LS; 318/265, 318/266, 672, 673, 466, 467; 200/65, 66, 153 N

[56] References Cited

U.S. PATENT DOCUMENTS 3,441,824  4/1969  Radisch et al. ..................... 318/265
3,614,574  10/1971  Hodges et al. ..................... 318/467
3,989,954  11/1976  Weiner ............................. 307/10 LS

FOREIGN PATENT DOCUMENTS 2053660  5/1972  Fed. Rep. of Germany .
2054152  5/1972  Fed. Rep. of Germany .
2055641  5/1972  Fed. Rep. of Germany .
2117731  10/1972  Fed. Rep. of Germany ...... 307/10 LS
15332  of 1900  United Kingdom .................... 318/265
1555763  11/1979  United Kingdom .

Primary Examiner—L. T. Hix
Assistant Examiner—W. J. Brady
Attorney, Agent, or Firm—James B. Raden; Donald J. Lenkszus

[57] ABSTRACT

A device for adjusting the inclination of vehicular headlamps includes an electric motor for positioning the headlamps, an adjusting switch for selecting one of a plurality of predetermined headlamp positions and a reversing switch connected to the adjusting switch. The reversing switch is mechanically coupled to the actuator of the adjusting switch such that when the direction of headlamp inclination is reversed, the motor direction is reversed thereby preventing momentary movement of the headlamps through unintended angles of inclination.

5 Claims, 8 Drawing Figures

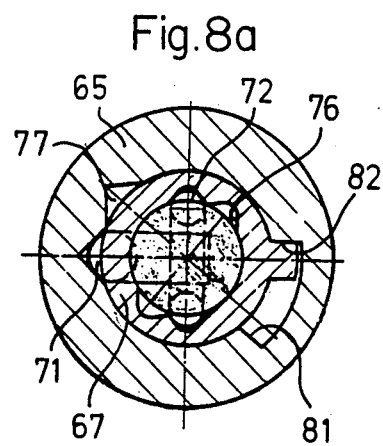
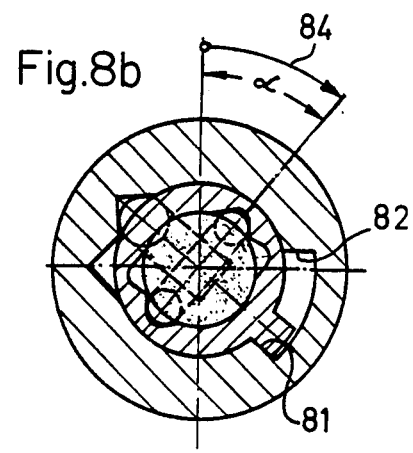
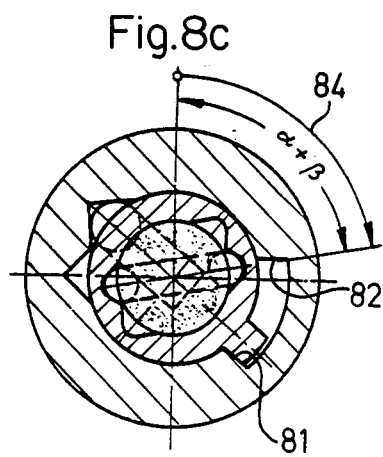
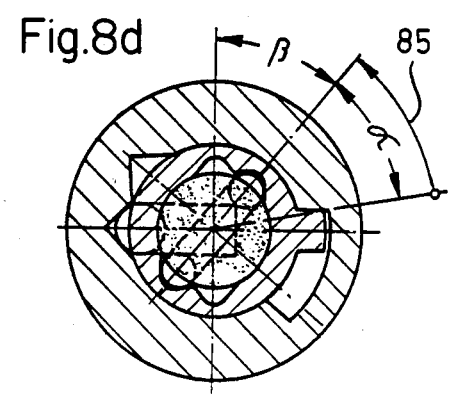

DEVICE FOR ADJUSTING THE INCLINATION OF MOTOR VEHICLE HEADLAMPS

BACKGROUND OF THE INVENTION

1. Field of the Invention

This invention pertains to a motor driven device for adjusting the inclination of motor vehicle headlamps.

2. Description of the Prior Art

Such devices are increasingly installed in modern motor vehicles to prevent the headlights from blinding oncoming traffic when, for example, the motor vehicle is carrying a heavy load. In known mechanisms of this kind, the headlight is swiveled round a horizontal axis by means of a crank gear. In such mechanisms, the direction of rotation of the electric motor must be variable in order to provide that the headlight can be brought into the right position as quickly as possible without having thereby to pass through the dead position of the crank gear. Passing through the dead position can, under certain circumstances, result in a momentary directing of the headlights towards the oncoming traffic.

In a known device complying with this requirement, the operating switch has two mechanically coupled bridging contacts in two switching planes, through which the positive and negative terminals of the supply voltage source can be connected to one each of n stationary contacts, whereby n corresponds to the number of desired adjusting possibilities. These 2 n stationary contacts are each connected to a slide spring by means of a lead and cooperate with a switching disk connected with the motor shaft in a manner that is protected against torsion. The switching disk is provided on both sides with two contact paths separated from each other by insulation and provided with contact gaps. On each of these four contact paths, a slide spring resiliently rests. The slide springs are coupled in pairs and connected with the motor current supply lead. The electric motor is fed with operating current through these contact paths and the slide springs as long as the slide springs being applied to voltage will meet the contact gaps. Thus, it is ensured that the electric motor will be stopped in the right position by the switching disk which in connection with the slide springs forms positions switches.

In this embodiment, the operating switch is connected to the electric motor through 2 n leads. One pair of these leads conducts the motor operating current and therefore must have a suitable cross-section. Furthermore, the operating switch with two switching planes and 2 n contacts is of complicated design. Also, 2 n+4 slide springs are necessary to provide the position switches for stopping the electric motor in the right position. The production of switching disks provided with contact paths on both sides is relatively expensive.

SUMMARY OF THE INVENTION

It is an object of the invention to provide a simplified device of the above-mentioned type, wherein the operating switch as also the position switches can be produced more economically and can simplier be wired with the electric motor.

In accordance with the invention, polarity reversal of the supply voltage source and thereby the reversal of rotation is effected in the operating switch now, rather than by means of a complicated switching disk as in the prior art. Because of this, only n+1 leads are necessary between operating switch and electric motor. The switching disk is provided with two contact paths only on one side upon which n+1 slide springs are resting. Thereby, one contact gap is still necessary. However, the operating switch can substantially be simplified.

In accordance with the invention, the reversing switch is in the operating switch rather than in the position switches. The reversing switch operates in dependence on the direction of switching, i.e., the reversing switch changes from one switching position to another when the direction of switching is changed and will remain in its switching position when the operating switch continues to operate in the same direction of switching.

According to one embodiment of the invention, if several electric motors are used for adjusting several headlights, e.g., for adjusting fog headlights or broad beam headlights, the position switches of all electric motors are controlled separately. In such an embodiment, there is a lot of wiring, especially where the distance between operating switch and headlights is very large. According to an advantageous improvement of the invention, this disadvantage can be avoided, if through the bridging contact of the adjusting switch only the position switches of a first electric motor are individually controlled, whereas the position switches of a next electric motor will be controlled through make contacts which are actuated with delay by the switching cam driven by the first electric motor. Thereby, the delayed control of the electric motors additionally entails the advantage that the starting current for all electric motors does not simultaneously flow through the operating switch which favorably influences the duration of its operating life.

Further in accordance with the invention, the electric motor can be produced more economically by connecting a switching disk with contact gap to the driven shaft of the electric motor in a way that it is protected against torsion, the switching disk serving as a position switch. Slide springs corresponding in number to the desired number of adjusting possibilities rest upon a contact path on the disk and are staggered towards each other by specific angles. The contact path is continuously connected with the one terminal of the electric motor via a further slide spring. The interruption of the motor operating current is effected by a contact gap and the adjusting angles are defined by the location of the slide springs.

A particularly compact type of switch has been created by the special design of operating switch with reversing switch and adjusting switch in a switch housing and the connection of these two through contacts. The use of a coupling element of two parts between the two switch units and the switch housing enables a further reduction of wiring and also allows the use of rotary, tumbler and push switches. In the same manner, a wide range of coupling elements can be used in accordance for various applications without comprehensive adaptation work.

BRIEF DESCRIPTION OF THE DRAWINGS

The invention may be better understood from a reading of the following description taken in conjunction with the drawings in which like reference designations refer to like parts and in which:

FIG. 8 illustrates in schematic form with a rotary switch the switching principle of the preceding types of switches.

DETAILED DESCRIPTION OF THE DRAWINGS

Figure 1:
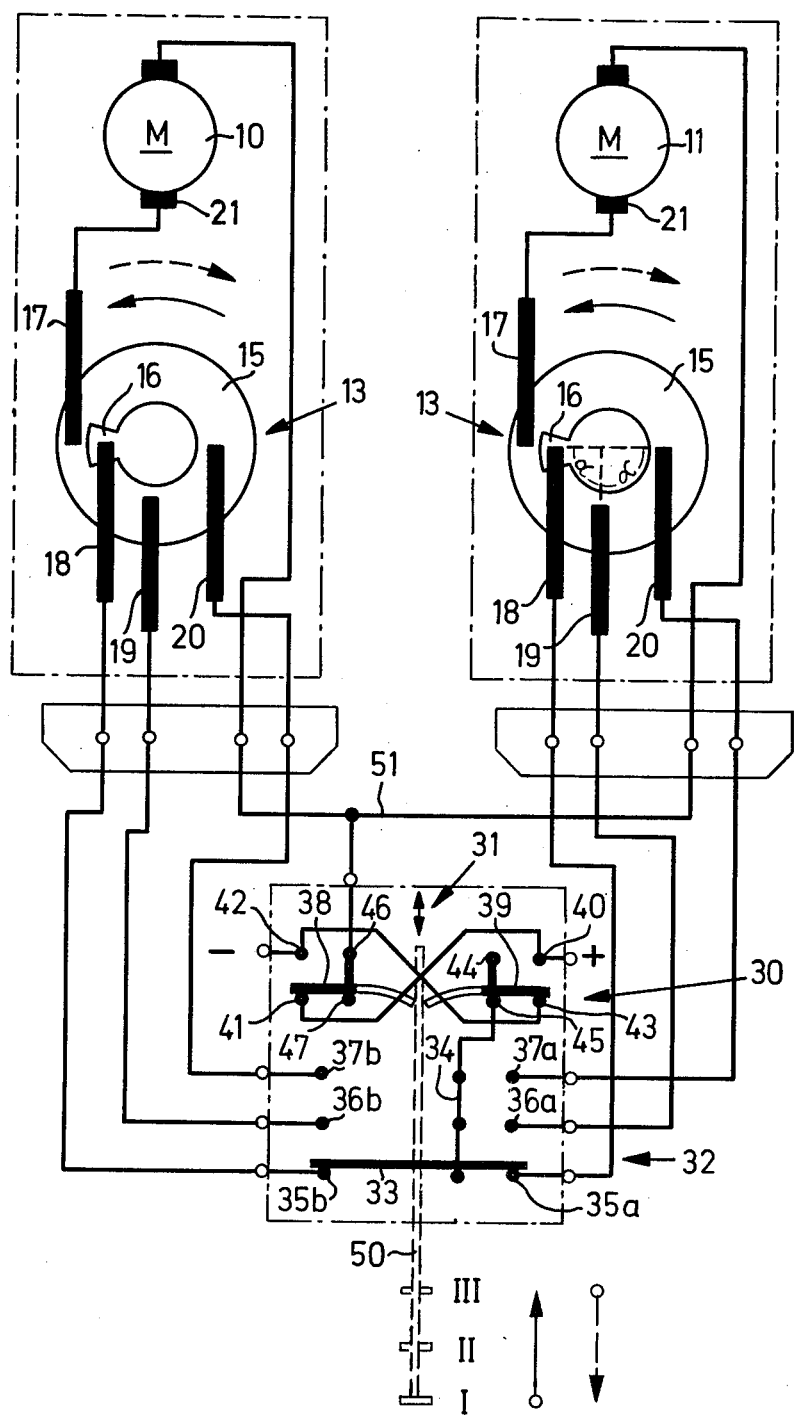
FIG. 1 is a schematic diagram of a headlight adjustment circuit in accordance with the invention.

In FIG. 1 two electric motors 10 and 11 are to swivel the headlights of motor vehicles through suitable means for transmission of motion. To the drive shafts of the electric motors 10, 11, one switching disk 13 each is coupled in a manner that it is protected against torsion. Each switching disk 13 carries a contact path 15 with a contact gap 16. Four slide springs 17, 18, 19 and 20 rest upon the contact path 15. Slide spring 17 continuously connects terminal 21 of the electric motor to the contact path 15. Three other slide springs 18, 19 and 20 rest upon a circular ring on the contact path 15 at the same distance from the center of the switching disk, whereby the circular ring is interrupted by the contact gap 16. The slide springs together with the switching disk 13 and its contact path 15 form several position switches, for as soon as one of the slide springs 18, 19 or 20 engages in the contact gap, the one current supply lead to the electric motor 10 or 11 is interrupted.

As FIG. 1 shows the slide springs 17, 19 and 20 are staggered, whereby the angles α are 90° each. To these staggered angles, α corresponds a specific angle of inclination of the headlights between the corresponding positions. Through these slide springs, the electric motor is thus always switched off when the headlights are in a specific position relative to the road.

The electric motors 10 and 11 are energized via an operating switch 30 having a reversing switch 31 dependent on the direction of switching as well as a three-stage adjusting switch 32. The adjusting switch has a displaceable bridging contact 33 which in each of the three switching positions is connected in an electrically conductive manner with a connector 34. In the three possible switching positions, the bridging contact 33 connects the connector 34 with two position contacts 35a and 35b or 36a and 36b or 37b each.

The reversing switch has two movable contacts 38 and 39 cooperating with eight stationary contacts 40 to 47. The stationary contacts 40 and 41 are connected to one side of the voltage supply and contacts 42 and 43 are connected to the other side of the voltage supply. The stationary contacts 44 and 45 and 46 and 47 are connected with each other in an electrically conductive manner.

Referring now to FIG. 2, it can be seen that the movable contacts 38 and 39 may only be brought into two switching positions, though they are actuated through the switch shaft 50 being adjustable into three switching positions. The reversing switch 31 operates in dependence on the direction of switching because the switching element carrying the movable contacts 38 and 39 is connected with the switch shaft via a coupling element, as will be described in detail later.

Figure 2A:
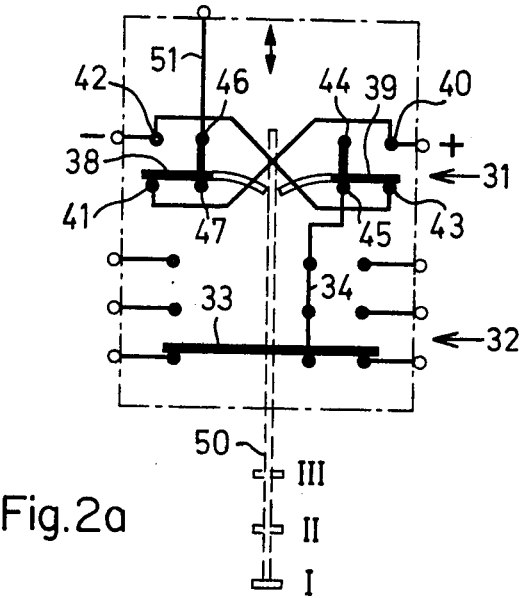
FIG. 2 is a schematic view of the operating switch of FIG. 1 in several switching positions.

FIG. 2a shows the operating switch in the switching position I. The bridging contact 33 connects the connector 34 with the position contacts 35a and 35b. The movable contact 38 of the reversing switch 31 connects the stationary contact 41 to the stationary contact 47. Thus, the positive terminal of the voltage source is applied to one motor current supply lead 51. The other movable contact 39 connects the stationary contacts 43 and 45 and thereby joins the negative terminal of the voltage source to the connector 34 upon which the bridging contact 33 of the position switch 32 is permanently resting.

Figure 2B:
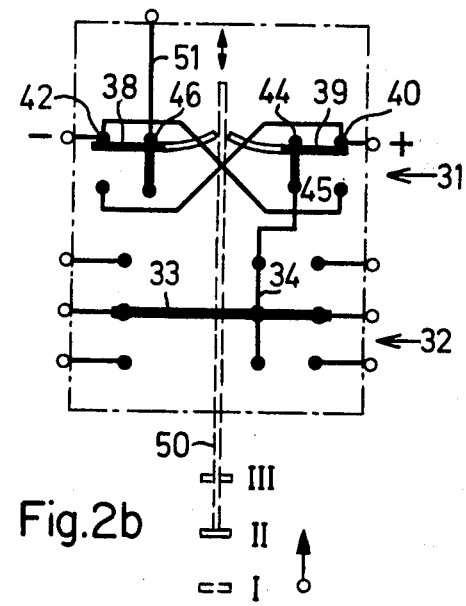

If the switch shaft is now displaced into the switching position II, according to FIG. 2b the positive terminal of the supply voltage source is connected to the connector 34 via the movable contact 39 and the stationary contacts 40, 44 and 45, whereas the negative terminal of the supply voltage source is connected with the motor current supply lead 51 via the stationary contacts 42 and 46 and the movable contact 38.

Figure 2C:
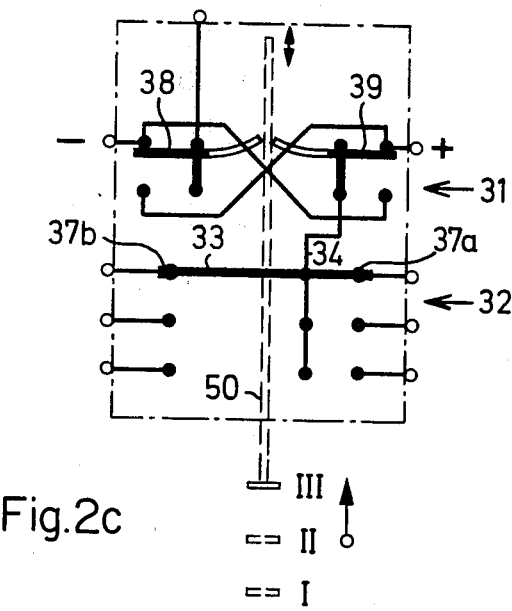
Figure 2D:
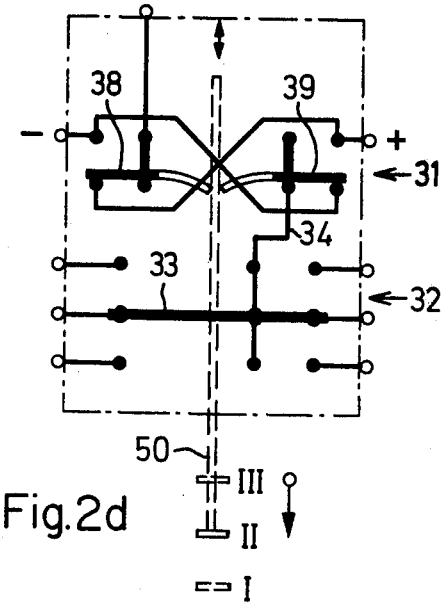

In FIG. 2c the switch shaft 50 is displaced into the switching position III in the same direction of switching. The reversing switch is thereby not actuated, but now the bridging contact 33 connects the position contacts 37a and 37b with the connector 34. If, from this switching position III, the switch shaft 50 is again reset into the switching position II, the reversing switch jumps over to its other switching position. From a comparison between FIG. 2b and 2d, it can thus be seen that the position of the reversing switch 31 in the switching position II depends on the direction of switching in which said switching position II is approached.

The described mechanism operates as follows: In the switching position I shown in FIG. 1, the electric motors 10 and 11 are switched off because the slide spring 18, controlled via the adjusting switch 32, rests upon the contact gap 16. Thus, one motor current supply lead is interrupted. If the operating switch 30 is reversed to the other switching position II, negative potential is applied to the motor current supply lead 51 (see FIG. 2B), whereas the slide spring 19 is connected to the positive terminal of the supply voltage source via the bridging contact 33. The electric motors 10 and 11 receive their operating current via the slide spring 17 so that they rotate in anti-clockwise direction. Thereby also, the switching disk 13 is adjusted until the energized slide spring 19 will engage with the contact gap 16 of the contact path 15. Then the electric motors 10 and 11 are switched off.

When the switch shaft is now displaced into the switching position III, the direction of rotation of the electric motors 10, 11 does not change because the reversing switch 31 is not actuated (see FIG. 2c). But now the slide spring 20 is controlled and the electric motors adjust the headlights anew at a specific angle of inclination until the slide spring 20 springs into the contact gap 16.

If, however, starting with the switching position II, the switch shaft is reset into the switching position I, the reversing switch again has the position shown in FIG. 1. Now the slide spring 18 is controlled with negative potential via the bridging contact 34, whereas the motor current supply lead 51 via the contacts 46, 47, 38, 41 and 40 is applied to positive potential. The electric motors 10 and 11 rotate in clockwise direction until the slide spring 18 jumps into the contact gap 16.

In such an embodiment, the switching disk 13 turns round only by 180° so that a crank gear driven by the electric motors 10, 11 never passes through the deadcenter positions. In this manner, a quick adjustment of the headlights is ensured without dazzling the oncoming traffic unnecessarily. Thereby, it is essential that the reversing switch 31 is integrated in the operating switch 30 and is not effected by slide springs and additional contact paths on the switching disk. Then in a three-stage operating switch indeed only three control leads for the slide springs 18, 19 and 20 as well as an additional motor current supply lead 51 are necessary.

In the embodiment according to FIGS. 1 and 2, the two electric motors 10 and 11 are energized via the one operating switch 30. For this purpose, only one reversing switch 31 is necessary, but two adjusting switches are required because the corresponding slide springs of the two electric motors may not be switched in parallel.

Figure 3:
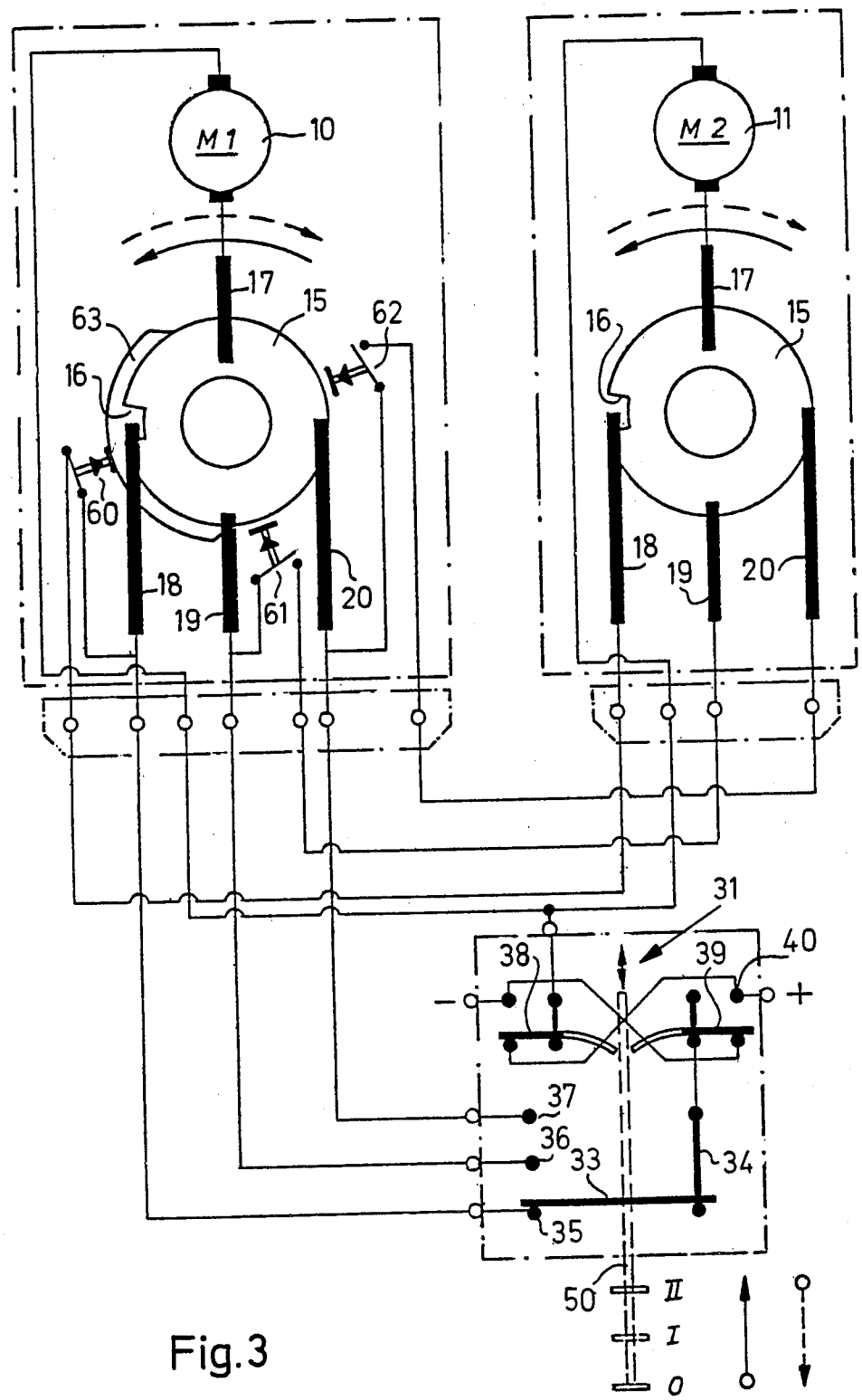
FIG. 3 is a schematic diagram of a modified embodiment of the invention.

With the position switches as shown in FIG. 1, the corresponding slide springs have to be separately controlled via the bridging contact 33. Then four leads are necessary from the operating switch to each motor. This disadvantage is avoided in the embodiment according to FIG. 3 in that the slide springs for the electric motor 11 are controlled via make contacts 60, 61, 62 associated with electric motor 10 which are actuated by a switching cam 63 formed on the switching disk. The make contacts 60, 61 and 62 are staggered with respect to the slide springs 18, 19, 20 so that the electric motor 11 in comparison to the electric motor 10 starts with delay. Thus, the high starting current of the two electric motors does not flow through the operating switch simultaneously. In addition, the construction of the operating switch is simplified and the wiring is reduced because the distance between two headlights to be adjusted is usually smaller than the distance from the operating switch to the headlights.

Figure 4:
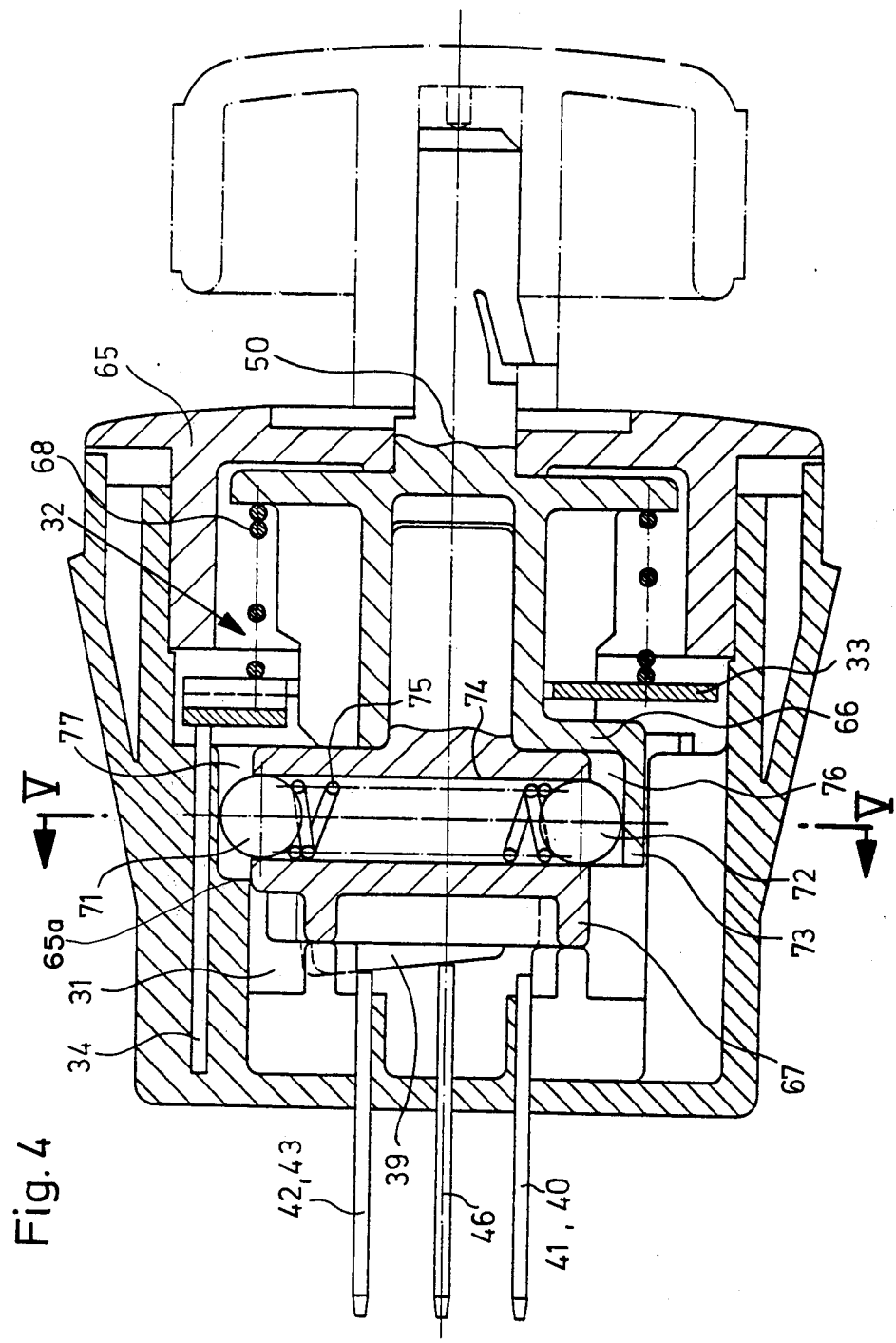
FIG. 4 is a longitudinal section through an operating switch.
Figure 5:
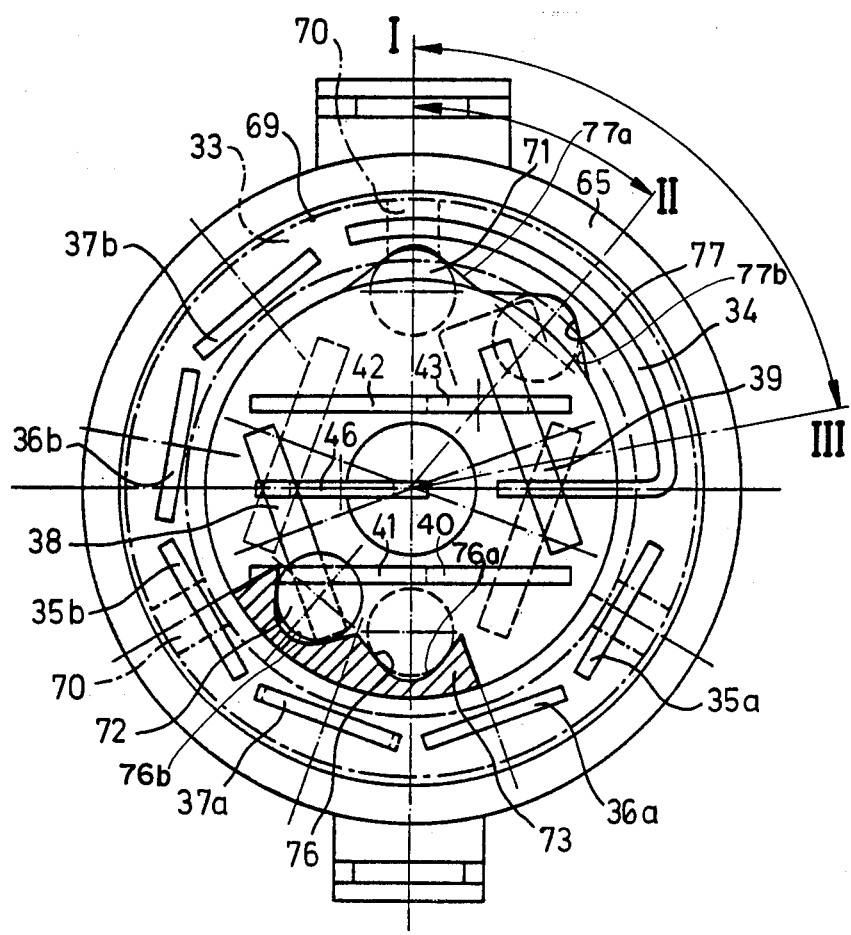
FIG. 5 is a section taken on the line V—V of FIG. 4, whereby the bridging contact of the adjusting switch is indicated by dash-dotted lines.

A first embodiment of an operating switch is shown in FIGS. 4 and 5. A switch shaft 50 mounted in the switch housing 65 receives the switching member 66 which again serves as a guide bearing for a switching element 67 of the reversing switch 31. The switching member is provided with a bridging contact 33 loaded by a pressure spring 68 which is formed as a triple bridge with contact cams 70 located on an orbit 69 and is resting upon the position contacts 35, 36, 37 located in the switch housing 65. The functional connection of the switching member 66 with the switching element 67 is effected by a coupling element. The coupling element in the present example is made of two pieces, whereby the first coupling element 71 is located between the switching element 67 and the switch housing 65 and the second coupling element 72 between the switching element 67 and a locking segment 73 of the switching member 66. The coupling elements 71 and 72, designed as balls, are guided in a channel 74 receiving a pressure spring 75 being effective in both directions and are running in locking paths 76 and 77. Locking path 76 includes two detents 76a and 76b which are formed in the switching member 66. Locking path 77 includes two detents 77a and 77b which are formed in the housing portion 65a. The locking path 76 has a bigger inclination than the locking path 77, the second coupling element is thereby provided with a greater locking force and thus can transmit a higher quantity of motion. With the switch in position I, ball 71 is in detent 77a and ball 72 is in detent 76a. As shaft 50 is rotated to position II, the switching member 66 rotates and ball 71 is carried into detent 77b.

As switching member 66 rotates, the switching element 67 rotates and ball 72 remains in detent 76a. As shaft 50 is rotated to position III, switching member 66 rotates. However, detent 76b acting on ball 71 prevents further rotation of switching element 67. Consequently, ball 72 is carried to detent 76b whereas ball 71 remains in detent 77b.

If, now the shaft 50 is rotated to position II, switching member 66 is rotated. Switching element 67 likewise rotates carrying ball 71 to detent 77a. Ball 72 will remain in detent 76b. Finally, if the shaft 50 is returned to position I, switching member 66 is rotated carrying ball 72 to detent 76a. Switching element 67 will remain in its prior position.

Figure 6:
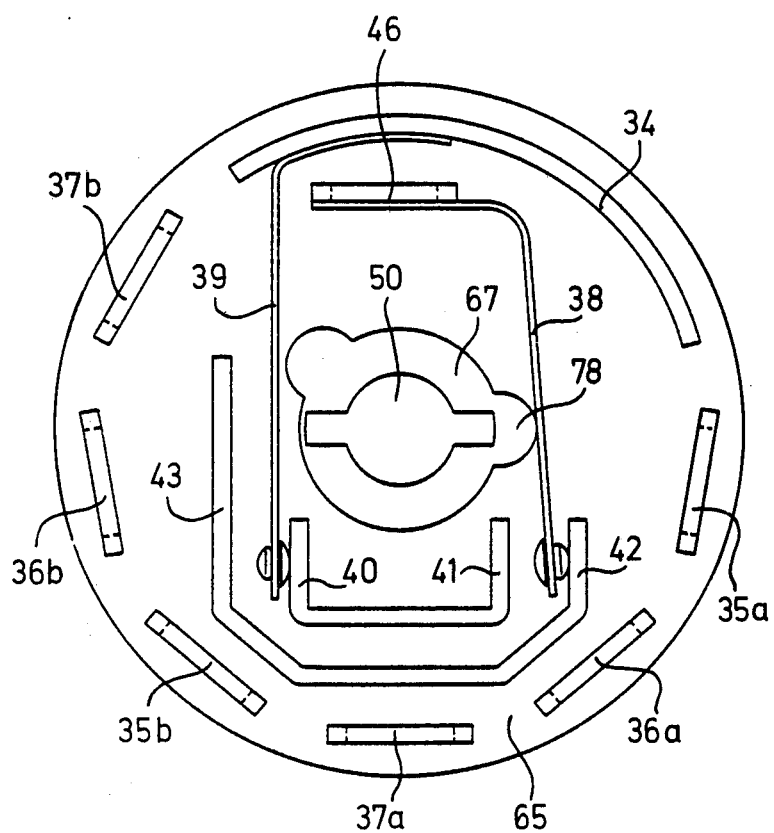
FIG. 6 is a further embodiment presented in a manner which is similar to that of FIG. 5.

Whereas, in the switch according to the FIGS. 4 and 5, the movable contacts 38 and 39 are mounted on the switching element 67 of the reversing switch in well-known manner, the movable contacts according to FIG. 6 are fixed in the switch housing 65 under initial tension. They are acted upon by cams 78 on the switching element and, as element 67 turns, are pressed against the stationary contacts 40 and 42 of the supply voltage source.

Figure 7:
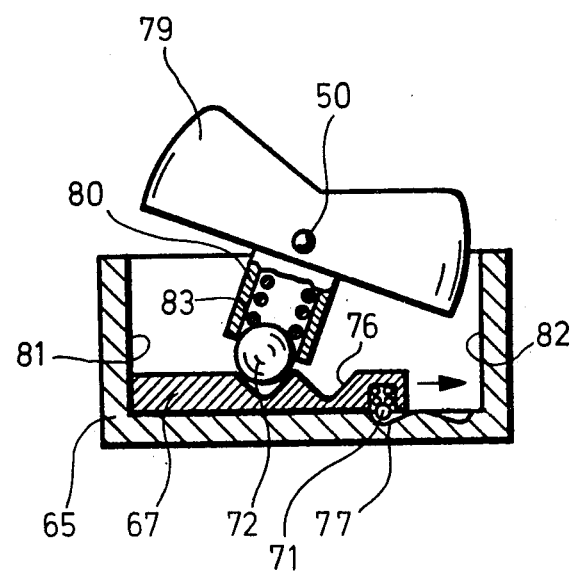
FIG. 7 is a third embodiment as a tumbler switch.

FIG. 7 shows a tumbler switch; the switching functions of this switch are the same as those described in the preceding examples. In the switch housing 65, a tiltable key 79 is mounted to be swiveled round the switch shaft 50. The second coupling element 72 is articulated to the tiltable key 79. Said coupling element is held in a tube-shaped lug 80 by a locking spring 83 and adjusts the switching element in the area of the stops 81 and 82 which in this very schematic example are formed by the walls of the switch housing. The second coupling element 72 is guided in the switching element 67 via the locking path 76. Locking path 76 again has a bigger inclination than the locking path 77 which is acted upon by the first coupling element 71. The different quantities of transmission motion of the coupling elements could, of course, be also achieved by a change in the spring characteristic.

The simplified rotary switch of FIG. 8 illustrates the switching principle of the previously described switches. In a housing 65, the switching element 67 is rotatably mounted between two stops 81 and 82 and is adjustable via a first coupling element 71 in two positions by means of the locking path 77 having little inclination. The coupling element 71 supports in the switching element 67. The switch shaft 50 and switching element is provided with the second coupling element 72 which is guided in the switching element via the steep locking path 76 having two switching positions. In order to simplify this example, only two switching positions were defined for the adjusting switch (switching member 66). It is, however, possible to increase the switching positions in accordance with the space available. When the switch shaft 50 is swiveled in direction 84 through angle α, at first the switching element 67, because of the smaller locking force of the first coupling element 71, is turned round to the stop 81. The operating switch is in the first locking position according to FIG. 8b. When the switch shaft 50 is rotated further in direction 84, the switching member is turned through the angle β relative to the switching element until resting upon the stop 81, thereby overcoming the clearly higher locking force of the second coupling element. The operating switch has reached the locking position according to FIG. 8c. Upon a change of the direction of rotation in direction 85 as illustrated in FIG. 8d, at first switching element and switching member remain in the same position relative to each other due to the higher locking force of the second coupling element 72. The entire unit is swiveled back by the angle α until the switching element 67 rests upon the stop 82. Thus, the direction of rotation of the motor is reversed (switching position FIG. 8d). The switching member, relative to the switching element, only then can be further adjusted by the angle β, whereby the position, according to FIG. 8a, is reached again.

Although the illustrative embodiments of the invention are advantageously adapted to adjusting motor vehicle headlights, they may also be advantageously used where a movable element has to be brought into several switching positions. It should also be apparent that the operating switch can control more than three position switches. For this purpose, the adjusting switch has to be modified correspondingly, whereas the position switch can remain unchanged because it has to be provided with only two switching positions.

It will be apparent to those skilled in the art that various other modifications may be made without departing from the spirit or scope of the invention. For example, the bridging contacts 38 and 39 of the operating switch may be lengthened in a way that they resiliently rest upon the switch shaft 50. Further, two friction wheels may drive the switch shaft whereby the axes of rotation of the friction wheels are operatively connected with the bridging contacts 38 and 39.

What is claimed is:

1. A device for adjusting the inclination of vehicular headlamps comprising:
    at least one direct current motor coupled to at least one of said headlamps;
    a power source having first and second terminals of opposite polarity;
    an operating switch assembly including a multistage adjusting switch having a bridging contact;
    a first plurality of position switches each serially connectable with said motor and said bridging contact to interrupt current to said motor when said headlamps are at predetermined positions;
    characterized in that:
    said operating switch comprises: a switch housing; a reversing switch having input terminals connected to said first and second terminals, a first output terminal connected to said motor, and a second output terminal connected to said bridging contact; said bridging contact being operable to selectively connect each of said plurality of position switches to said reversing switch; said reversing switch when operated in a first direction being operable to connect said first terminal to said first output terminal, and said second terminal to said second output terminal and when operated in a second direction being operable to connect said second terminal to said first output terminal and said first terminal to said second output terminal; a switching member carrying said bridging contact; a switch shaft for adjusting said switching member, said switching member being operatively connected with one switching element of said reversing switch; means for connecting said switching element and said switching member in a force-locking manner when the direction of motion of the switch shaft is reversed; said connecting means comprising a plurality of stops disposed on said housing, a first coupling element between said switching element and said housing and a second coupling element between said switching element and said switching member, said first coupling element being adapted to selectively engage said plurality of stops, and said second coupling element being adapted to transmit a greater degree of motion than said first coupling element.

2. A device according to claim 1, wherein said first and second coupling elements each comprises a locking mechanism having a different locking force.

3. A device according to claim 1 comprising a connector projecting from said multistage adjusting switch into said reversing switch, whereby said bridging contact of said multistage adjusting switch rests upon said connector in all switching positions.

4. A device according to claim 3, wherein said bridging contact includes a triple bridge and contact cams located on an orbit, and wherein said position switches contacts arranged below said bridging contact.

5. A device according to claim 3 or 4, wherein said reversing switch includes movable contacts resiliently arranged beside stationary contacts in said switch housing for connection to said power source, said movable contacts being actuated by cams on said switching element.

* * * * *